(12) United States Patent
Husson et al.

(10) Patent No.: US 6,261,025 B1
(45) Date of Patent: Jul. 17, 2001

(54) ASSEMBLY DEVICE FOR FLAT PIECES AND TUBULAR ELEMENTS

(75) Inventors: Daniel Husson, Kaysersberg; Alain Pontius, Bennwihr, both of (FR)

(73) Assignee: Husson Collectivites S.A. (Societe Anonyme), Lapoutroie (FR)

( * ) Notice: Subject to any disclaimer, the term of this patent is extended or adjusted under 35 U.S.C. 154(b) by 0 days.

(21) Appl. No.: 09/335,473

(22) Filed: Jun. 18, 1999

(30) Foreign Application Priority Data

Jun. 18, 1998 (EP) .................................................. 98440134

(51) Int. Cl.$^7$ ....................................................... F16B 9/02
(52) U.S. Cl. ........................ 403/188; 52/655.1; 52/656.9; 403/388
(58) Field of Search ................................ 52/655.1, 656.9; 403/167, 168, 188, 384, 388

(56) References Cited

U.S. PATENT DOCUMENTS 2,323,829  7/1943  McArthur .

FOREIGN PATENT DOCUMENTS

| 388 449 | 5/1932 | (BE) . |
|---|---|---|
| 86 05 170 | 4/1986 | (DE) . |
| 297 06 757 U | 6/1997 | (DE) . |
| 1 483 186 | 8/1967 | (FR) . |
| 2 514 844 | 4/1983 | (FR) . |
| 2 605 687 | 4/1988 | (FR) . |

Primary Examiner—Carl D. Friedman
Assistant Examiner—Kevin D. Wilkens
(74) Attorney, Agent, or Firm—Young & Thompson

(57) ABSTRACT

An assembly device for flat pieces (2) and tubular elements (1) comprises elements for securement of the flat pieces (2) on the infrastructure tubular elements (1). The securement elements are provided each with at least one element (5) for prepositioning and gripping on the infrastructure tubular elements (1). The device is more particularly applicable to the field of the assembly of structural elements in the form of flat pieces and tubular elements, in particular for leisure equipment, especially playground equipment for children.

7 Claims, 2 Drawing Sheets

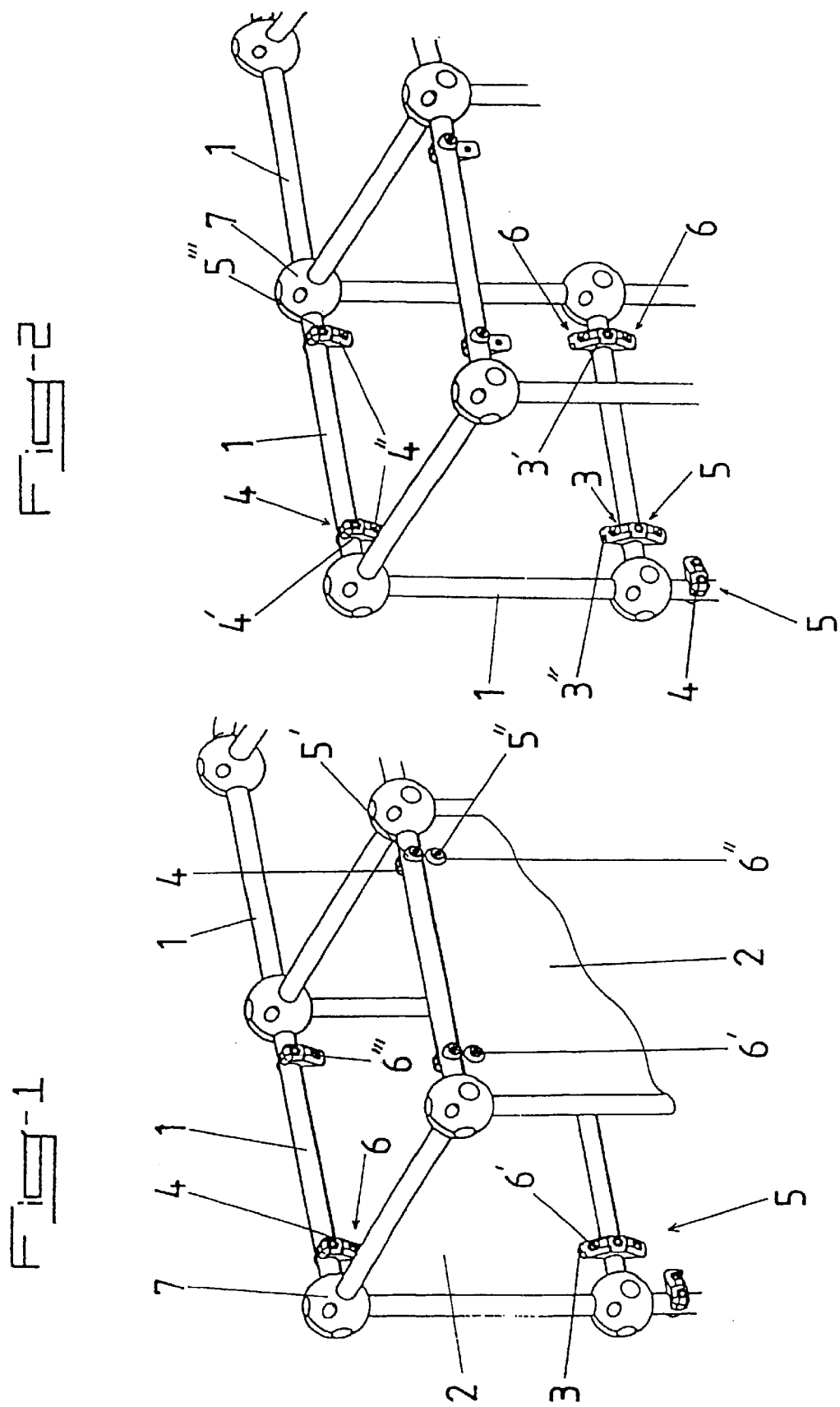

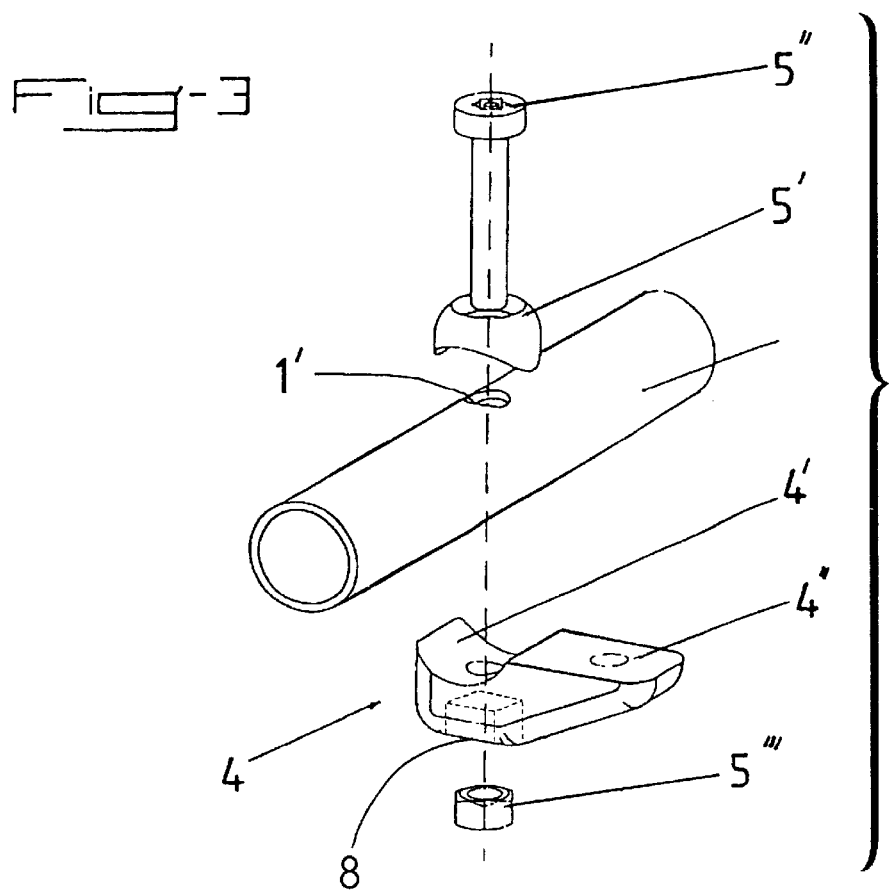
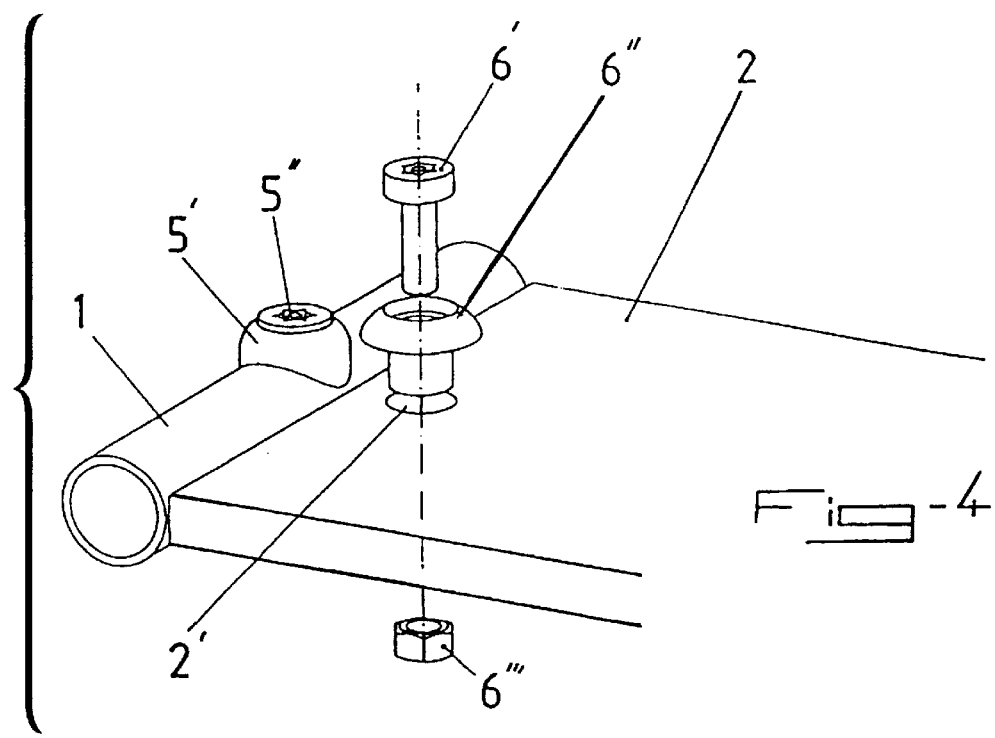

ASSEMBLY DEVICE FOR FLAT PIECES AND TUBULAR ELEMENTS

The present invention relates to the field of assembling elements of structures in the form of flat pieces and tubular elements, particularly for leisure equipment, especially equipment for playgrounds for children, and has for its object an assembly device for flat pieces and tubular elements.

BACKGROUND OF THE INVENTION

The structures for leisure equipment, particularly for playground equipment for children, are generally constituted by an assembly of flat pieces in the form of panels and tubular elements simultaneously forming the infrastructure. To this end, the infrastructure of tubular elements is in the form of a mechanical-welded assembly or mechanically assembled assembly, on which are fixed the flat pieces. The assembly of these pieces on the infrastructure is at present carried out by the provision of mounting tongues, secured to the tubular elements and on which the flat pieces are fixed by screwing or bolting, these mounting tongues being also of metal, so as to satisfy the requirements of mechanical strength.

Such an embodiment however has the drawback of requiring a relatively complicated assembly work for the pieces by welding and precise positioning of these latter. Thus, the mounting tongues adapted for the securement of the flat pieces require extremely precise positioning on the infrastructure, so as to avoid any error of securement of the flat pieces and eventual misalignment of these latter.

SUMMARY OF THE INVENTION

The present invention has for its object to overcome these drawbacks by providing an assembly device for flat pieces and tubular elements permitting simple and rapid mounting of the pieces of different shape, whilst ensuring perfect finish of the equipment thus provided.

Thus, according to the invention, the assembly device for flat pieces and tubular elements is characterized in that it is essentially constituted by securement means for the flat pieces on said tubular elements, said securement means being provided each with at least one prepositioning and gripping means on the infrastructure tubular elements.

BRIEF DESCRIPTION OF THE DRAWINGS

The invention will be better understood from the following description, which relates to a preferred embodiment, given by way of non-limiting example, and explained with reference to the accompanying schematic drawings, in which:

FIG. 1 is a fragmentary perspective view of a play device whose constituent elements are assembled by means of the device according to the invention;

FIG. 2 is a view similar to that of FIG. 1, of the play device before mounting the flat pieces;

FIG. 3 is a perspective view, on a larger scale, showing the mounting of a securement means of a flat piece on a tubular element, and FIG. 4 is a view similar to that of FIG. 3 showing the mounting of a flat piece on a corresponding securement means.

DETAILED DESCRIPTION OF THE INVENTION

FIGS. 1 and 2 of the accompanying drawings show, by way of example, a play device, which is constituted by an infrastructure formed by tubular elements 1 and by flat pieces 2 fixed on said infrastructure by means of an assembly device for flat pieces and tubular elements. The flat pieces 2 are preferably in the form of casing panels.

According to the invention, this assembly device for flat pieces and tubular elements is essentially constituted by means 3 and 4 for securement of the flat pieces 2 on said tubular elements 1, said securement means 3 and 4 being provided each with at least one prepositioning and gripping means 5 on the tubular elements 1 of the infrastructure (FIGS. 1 to 4).

The means 3 for securement of the flat pieces 2 are preferably constituted each by a half collar having on each side of a recess 3' two bearing tongues 3" extending in a same plane, by a positioning and gripping means 5 of said half collar on a tubular element 1 and by at least two assemblies 6 for gripping the flat pieces 2 on the bearing tongues 3". The means 5 for prepositioning and gripping of the half collar on a tubular element 1 is preferably constituted by a bearing piece 5' comprising a semicylindrical concavity of a cross-section corresponding to that of the tubular elements 1, by a screw 5" passing through said bearing piece 5' and a corresponding hole 1' for the tubular elements 1 and co-acting with a nut 5"' disposed in the half collar (FIGS. 1 and 2). The screw 5" is preferably a six-sided hollow screw or the like, whose head is disposed, in the gripping position, in a corresponding recess of the bearing piece 5'.

Thus, the securement means 3 for the flat pieces 2 can be prepositioned without gripping on the tubular elements 1 by means of the means 5, of which the screws 5" are simply lightly screwed into the nuts 5"', leaving an operating play between the bearing pieces 5' and the tubular elements 1. As a result, there is the possibility of carrying out the final gripping of the screws 5" only after mounting of the flat pieces 2, such that the latter is more easily carried out. Thus, so long as the securement means 3 for the flat pieces 2 are not gripped on the tubular elements 1, there remains a possibility of pivoting of these latter relative to the tubular elements 1 and thus a greater freedom of positioning of said flat pieces 2 relative to said tubular elements 1, before final gripping of the screws 5".

The means 4 for securement of the flat pieces 2 on the tubular elements 1 (FIGS. 1 to 4) are each constituted by an asymmetric half collar having a recess 4' adjacent a bearing tongue 4", by a prepositioning and gripping means 5 for said half collar on a tubular element 1 and by at least one assembly 6 for gripping the flat pieces 2 on the bearing tongues 4". The prepositioning and gripping means 5 of the half collar is identical to that used with the means 3 for securement of the flat pieces 2 and permits the same freedom of mounting.

The gripping assemblies 6 for the flat pieces 2 on the bearing tongues 3" or 4" are each constituted by a screw 6' co-acting with a gripping and blocking ring 6", which centers itself and bears on the surface of the corresponding flat piece 2 opposite that bearing on the bearing tongue 3" or 4" of the corresponding means 3 or 4, and by a nut 6"' or 6"' mounted in a recess 8 of the bearing tongue 3" or 4" and coacting, for gripping, with the screw 6' passing through the flat piece 2 (FIGS. 1, 2 and 4).

The screws 6' of the assemblies 6 are preferably also in the form of hollow six-sided screws or the like, such as the screws 5", whose head comes into engagement in the surface position in a counterbore provided in the gripping and blocking ring 6". This ring 6" is in the form of a shouldered member, whose portion of greatest diameter bears on the flat piece 2 and receives the head of the screw 6', and whose portion of reduced diameter forms a guide for the screw-threaded shank of the screw 6' in a corresponding hole 2' of the flat piece 2 (FIG. 4). Such embodiment of the assemblies 6 permits easy mounting of the flat parts 2 on the tubular elements 1 maintaining said flat parts 2 against any damage. Thus, by the provision of rings 6", the screws 6' do not enter directly into contact with the flat parts, so that they do not cause any degradation of the flat parts.

Moreover, the assemblies 6 also permit preliminary mounting without gripping the flat pieces 2 or the means 3 and 4 for securement of these pieces on the tubular elements 1, such that all the constituent elements of a structure can be assembled and positioned with precision before their final securement. As a result, the mechanical and aesthetic finish of the equipment thus obtained is perfect. Thus, thanks to the invention, it is possible to carry out, in a first instance, a mounting and perfect gripping of the flat pieces 2 on the means 3 and 4, so as to obtain a seamless connection of these flat pieces 2 on said means 3 and 4, then to carry out gripping of these latter on the tubular elements 1 by these means 5.

As shown particularly in FIGS. 1 and 2 of the accompanying drawings, the assembly of the tubular elements 1 of the infrastructure with each other is preferably carried out by means of assembly nodes 7 of the type particularly known from FR-A-p2 694 583 and consisting of two half shells assembled together by bolting and provided with corresponding recesses and/or holes for the insertion and blockage of ends of tubular elements. Such an assembly node permits carrying out an assembly, on the one hand, of the ends of several tubular elements by means of the half shells, the means for gripping the shells together serving simultaneously to block said ends at the level of the corresponding recesses and, on the other hand, the mounting of the end of other tubular elements perpendicular to the plane of the first with holding in position by specifically dedicated means. Thus, all the geometries of structures are possible. Moreover, such assembly nodes 7 permit absorbing if desired assembly mistakes of the flat pieces 2 on the tubular elements 1, because of the mounting play first necessary for the ends of said tubular elements 1 in said assembly nodes before their gripping.

Thanks to the invention, it is possible to provide structures constituted by an assembly of flat pieces and tubular elements, in particular for leisure equipment, especially playground equipment for children, by using elements of simple shape and construction not requiring more than simple machining operations and not cumbersome. Moreover, the mounting of such structures can be carried out in an extremely short time by unskilled operators and the pieces used leave no projecting irregularity that would be dangerous for the users.

Finally, the structures obtained by the practice of the present invention can be easily installed and if desired unmounted and permit easy adaptation, if desired, of the devices or complementary equipment that can be added on to.

Of course, the invention is not limited to the embodiment described and shown in the accompanying drawings. Modifications remain possible, particularly as to the construction of the various elements or by substitution of technical equivalents, without thereby departing from the scope of protection of the invention.

What is claimed is:

1. An assembly device for assembling flat pieces and tubular elements, comprising: a plurality of securement means for securing flat pieces on an infrastructure of tubular elements, each securement means being provided with at least one means for prepositioning and gripping the infrastructure of tubular elements; said means for prepositioning and gripping comprising a bearing piece having a semicylindrical concavity of a cross-section corresponding to that of the tubular elements, a screw for passing through said bearing piece, and through a corresponding hole of said tubular elements and coacting with a nut disposed in the half collar.

2. The assembly device according to claim 1, wherein each securement means comprises an asymmetric half collar having a recess adjacent a bearing tongue; and at least one assembly for gripping the flat pieces on each bearing tongue.

3. The assembly device according to claim 1, wherein the screw is a six-sided hollow screw having a head, and the bearing piece comprises a recess for accommodating said head.

4. The assembly device according to claim 1, wherein each securement means comprises a half collar having on opposite sides of a recess two bearing tongues extending in a same plane; and at least two assemblies for gripping the flat pieces on the bearing tongues.

5. The assembly device according to claim 4, wherein each gripping assembly comprises a screw coacting with a gripping and blocking ring; and a nut mounted in a recess of each bearing tongue for gripping with the screw, which in use passes through the flat piece.

6. The assembly device according to claim 5, wherein each screw of the assemblies is a six-sided screw having a head; and the gripping and blocking ring comprises a counterbore for receiving said head.

7. The assembly device according to claim 5, wherein the ring comprises a shouldered piece having a portion of greatest diameter, which in use, bears on the flat piece and receives the head of the screw; and a portion of reduced diameter which forms a guide for the screw-threaded shank of the screw, in a corresponding hole of the flat piece.

* * * * *